(12) United States Patent
Singh

(10) Patent No.: US 10,474,906 B2
(45) Date of Patent: Nov. 12, 2019

(54) HIGH DYNAMIC RANGE VIDEO OF FAST MOVING OBJECTS WITHOUT BLUR

(71) Applicant: Echelon Corporation, Santa Clara, CA (US)

(72) Inventor: Shalender Singh, Milpitas, CA (US)

(73) Assignee: Echelon Corporation, Santa Clara, CA (US)

(*) Notice: Subject to any disclaimer, the term of this patent is extended or adjusted under 35 U.S.C. 154(b) by 252 days.

(21) Appl. No.: 15/468,339

(22) Filed: Mar. 24, 2017

(65) Prior Publication Data

US 2018/0276482 A1 Sep. 27, 2018

(51) Int. Cl.
*G06K 9/00* (2006.01)
*H04N 5/235* (2006.01)
(Continued)

(52) U.S. Cl.
CPC ....... *G06K 9/00785* (2013.01); *H04N 5/2351* (2013.01); *H04N 5/2356* (2013.01);
(Continued)

(58) Field of Classification Search
CPC .... G06K 9/00785; G06K 9/66; G06K 9/6256; G06K 9/6202; G06K 9/00; G06K 9/62;
(Continued)

(56) References Cited

U.S. PATENT DOCUMENTS

| 4,647,975 A | 3/1987 | Alston et al. |
| 5,809,161 A | 9/1998 | Auty et al. |

(Continued)

FOREIGN PATENT DOCUMENTS

| KR | 20100086089 | 7/2010 |
| WO | WO2005122094 | 12/2005 |

(Continued)

OTHER PUBLICATIONS

Zhu, Fengqing, et al. "Spatial and temporal models for texture-based video coding." Electronic Imaging 2007. International Society for Optics and Photonics, 2007.

(Continued)

*Primary Examiner* — Dave Czekaj
*Assistant Examiner* — Berteau Joisil
(74) *Attorney, Agent, or Firm* — Locke Lord LLP

(57) ABSTRACT

Fast moving objects may be monitored by a video unit under a variety of lighting conditions. In a bootstrap phase, a model database is established for each of a plurality of sampling points, each model being a combination of color of the video image, respective optimum exposure, and respective lighting condition. Then in an image capture phase the video unit compares captured color and optimum exposure of the sampling point, with the models of color and respective optimum exposure in the model database, to find a best match lighting condition model in the model database. The video unit then adjusts an exposure setting to the most frequently occurring value for exposure among the other sampling points, if lighting conditions for the other sampling points are within a threshold range of the lighting condition of the best match model in the model database.

17 Claims, 8 Drawing Sheets

(51) Int. Cl.
*H04N 5/77* (2006.01)
*H04W 48/18* (2009.01)
*H04N 9/04* (2006.01)

(52) U.S. Cl.
CPC .............. *H04N 5/77* (2013.01); *H04N 9/045* (2013.01); *H04W 48/18* (2013.01)

(58) Field of Classification Search
CPC ...... H04N 5/2356; H04N 5/77; H04N 5/2353; H04N 5/235; H04W 48/18
See application file for complete search history.

(56) References Cited

U.S. PATENT DOCUMENTS

| | | | |
|---|---|---|---|
| 6,819,778 | B2 | 11/2004 | Kamei |
| 6,937,744 | B1* | 8/2005 | Toyama ............... G06T 7/20 348/14.1 |
| 7,123,166 | B1 | 10/2006 | Haynes et al. |
| 2003/0095189 | A1 | 5/2003 | Liu et al. |
| 2003/0103158 | A1 | 6/2003 | Barkan et al. |
| 2008/0094481 | A1* | 4/2008 | Rai .................... H04N 5/232 348/222.1 |
| 2011/0002531 | A1* | 1/2011 | Heisele ............ G06K 9/00208 382/154 |
| 2014/0046874 | A1 | 2/2014 | Li et al. |
| 2014/0249742 | A1 | 9/2014 | Krivacic et al. |
| 2015/0363940 | A1 | 12/2015 | Held et al. |
| 2016/0300489 | A1 | 10/2016 | Shafran |

FOREIGN PATENT DOCUMENTS

| | | |
|---|---|---|
| WO | WO 2006115676 | 11/2006 |
| WO | WO 2007078475 | 7/2007 |
| WO | WO 2008086293 | 7/2008 |

OTHER PUBLICATIONS

Peh, Chin-Hwee, and Loong-Fah Cheong. "Synergizing spatial and temporal texture." IEEE Transactions on Image Processing 11.10 (2002): 1179-1191.
Sun, Wen, et al. "DHTC: an effective DXTC-based HDR texture compression scheme." Proceedings of the 23rd ACM SIGGRAPH/ EUROGRAPHICS symposium on Graphics hardware. Eurographics Association, 2008.
Ward, Greg. "High dynamic range image encodings." (2006).
Mann, S., and R. W. Picard. "On Being 'Undigital' With Digital Cameras: Extending dynamic Range by Combining Differently Exposed Pictures, 7 pages."
Doretto, Gianfranco, et al. "Dynamic textures." International Journal of Computer Vision 51.2 (2003): 91-109.
Cooper, Lee, Jun Liu, and Kun Huang. "Spatial segmentation of temporal texture using mixture linear models." Dynamical Vision. Springer Berlin Heidelberg, 2007. 142-150.
Brainard, David H., and Laurence T. Maloney. "Surface color perception and equivalent illumination models." Journal of Vision 11.5 (2011): 1-1.
Mikic, Ivana, et al. "Moving shadow and object detection in traffic scenes." Pattern Recognition, 2000. Proceedings. 15th International Conference on. vol. 1. IEEE, 2000.
Heikkila, Marko, and Matti Pietikainen. "A texture-based method for modeling the background and detecting moving objects." IEEE transactions on pattern analysis and machine intelligence 28.4 (2006): 657-662.
Morris, Brendan Tran, and Mohan Manubhai Trivedi. "Learning, modeling, and classification of vehicle track patterns from live video." IEEE Transactions on Intelligent Transportation Systems 9.3 (2008): 425-437.
Yang, Tao, et al. "Real-time and accurate segmentation of moving objects in dynamic scene" Proceedings of the ACM 2nd international workshop on Video surveillance & sensor networks. ACM, 2004.
Written Opinion and Search Report for International Application No. PCT/US 18/23935 dated Jun. 6, 2018.

* cited by examiner

FIG. 3A

MODEL DATABASE 254

DATABASE OF MODELS OF COLORS AT EACH SAMPLING POINT FOR DIFFERENT EXPOSURES AND CONDITIONS

| MODELS | MODELS | MODELS | MODELS | MODELS | MODELS | MODELS |
|---|---|---|---|---|---|---|
| MODEL 5<br>COLOR<br>(r,g,b)<br>EXPOSURE<br>CONDITION | MODEL 15<br>COLOR<br>(r,g,b)<br>EXPOSURE<br>CONDITION | MODEL 25<br>COLOR<br>(r,g,b)<br>EXPOSURE<br>CONDITION | MODEL 35<br>COLOR<br>(r,g,b)<br>EXPOSURE<br>CONDITION | MODEL 45<br>COLOR<br>(r,g,b)<br>EXPOSURE<br>CONDITION | MODEL 55<br>COLOR<br>(r,g,b)<br>EXPOSURE<br>CONDITION | MODEL 65<br>COLOR<br>(r,g,b)<br>EXPOSURE<br>CONDITION | MODEL 75<br>COLOR<br>(r,g,b)<br>EXPOSURE<br>CONDITION |
| MODEL 4<br>COLOR<br>(r,g,b)<br>EXPOSURE<br>CONDITION | MODEL 14<br>COLOR<br>(r,g,b)<br>EXPOSURE<br>CONDITION | MODEL 24<br>COLOR<br>(r,g,b)<br>EXPOSURE<br>CONDITION | MODEL 34<br>COLOR<br>(r,g,b)<br>EXPOSURE<br>CONDITION | MODEL 44<br>COLOR<br>(r,g,b)<br>EXPOSURE<br>CONDITION | MODEL 54<br>COLOR<br>(r,g,b)<br>EXPOSURE<br>CONDITION | MODEL 64<br>COLOR<br>(r,g,b)<br>EXPOSURE<br>CONDITION | MODEL 74<br>COLOR<br>(r,g,b)<br>EXPOSURE<br>CONDITION |
| MODEL 3<br>COLOR<br>(r,g,b)<br>EXPOSURE<br>CONDITION | MODEL 13<br>COLOR<br>(r,g,b)<br>EXPOSURE<br>CONDITION | MODEL 23<br>COLOR<br>(r,g,b)<br>EXPOSURE<br>CONDITION | MODEL 33<br>COLOR<br>(r,g,b)<br>EXPOSURE<br>CONDITION | MODEL 43<br>COLOR<br>(r,g,b)<br>EXPOSURE<br>CONDITION | MODEL 53<br>COLOR<br>(r,g,b)<br>EXPOSURE<br>CONDITION | MODEL 63<br>COLOR<br>(r,g,b)<br>EXPOSURE<br>CONDITION | MODEL 73<br>COLOR<br>(r,g,b)<br>EXPOSURE<br>CONDITION |
| MODEL 2<br>COLOR<br>(r,g,b)<br>EXPOSURE<br>CONDITION | MODEL 12<br>COLOR<br>(r,g,b)<br>EXPOSURE<br>CONDITION | MODEL 22<br>COLOR<br>(r,g,b)<br>EXPOSURE<br>CONDITION | MODEL 32<br>COLOR<br>(r,g,b)<br>EXPOSURE<br>CONDITION | MODEL 42<br>COLOR<br>(r,g,b)<br>EXPOSURE<br>CONDITION | MODEL 52<br>COLOR<br>(r,g,b)<br>EXPOSURE<br>CONDITION | MODEL 62<br>COLOR<br>(r,g,b)<br>EXPOSURE<br>CONDITION | MODEL 72<br>COLOR<br>(r,g,b)<br>EXPOSURE<br>CONDITION |
| MODEL 1<br>COLOR<br>(r,g,b)<br>EXPOSURE<br>CONDITION | MODEL 11<br>COLOR<br>(r,g,b)<br>EXPOSURE<br>CONDITION | MODEL 21<br>COLOR<br>(r,g,b)<br>EXPOSURE<br>CONDITION | MODEL 31<br>COLOR<br>(r,g,b)<br>EXPOSURE<br>CONDITION | MODEL 41<br>COLOR<br>(r,g,b)<br>EXPOSURE<br>CONDITION | MODEL 51<br>COLOR<br>(r,g,b)<br>EXPOSURE<br>CONDITION | MODEL 61<br>COLOR<br>(r,g,b)<br>EXPOSURE<br>CONDITION | MODEL 71<br>COLOR<br>(r,g,b)<br>EXPOSURE<br>CONDITION |
| SAMPLING<br>POINT (8,6) | SAMPLING<br>POINT (18,6) | SAMPLING<br>POINT (28,6) | SAMPLING<br>POINT (8,17) | SAMPLING<br>POINT (18,17) | SAMPLING<br>POINT (28,17) | SAMPLING<br>POINT (8,28) | SAMPLING<br>POINT (18,28) |

HIGH DYNAMIC RANGE VIDEO OF FAST MOVING OBJECTS WITHOUT BLUR

FIELD OF THE INVENTION

The invention disclosed broadly relates to video analysis under a variety of shadow, color change, and lighting conditions. The invention more particularly improves video monitoring of fast moving objects, such as vehicular traffic and traffic counting, under a variety of lighting conditions.

BACKGROUND OF THE INVENTION

A high dynamic range (HDR) image may be created by capturing a sequence of video frames of an object in a scene, each frame at a different light exposure. The result may be a sequence of bright, medium, and dark video frames, based on the amounts of light exposure. A process to combine images from the video frames, such as juxtaposing the same object's shape in the frames of the sequence, reveals details in the shadows and highlights of the object.

High dynamic range (HDR) is useful for still portraits in controlled lighting conditions. However, for monitoring moving vehicular traffic conditions and counting cars, for example, HDR makes detecting any moving objects in an image more difficult. In the case of traffic counting, HDR increases the chance of a blurry photo. Since HDR captures multiple images, the object moves between the first and second image, and thus the composite of those images will not have crisp edges. Crisp edges usually found in high contrast scenes, are better for object recognition. But, HDR will decrease contrast and therefore results in reduced object recognition success. Moreover, if the images are captured when it is too dark or too light, the object colors are washed out with HDR. HDR makes object recognition more difficult when, for example, a vivid red automobile drives by at night with bright headlights.

SUMMARY OF THE INVENTION

Example embodiments of the invention solve the problem of uneven lighting conditions and object movement in video monitoring in general and specifically for vehicular traffic and traffic counting.

The observed color of an object depends on both its surface characteristics and the characteristics of the light illuminating its surface. An object is observed to have the color of the light leaving its surface, which depends on the spectrum of the light illuminating its surface and the reflectance properties of the surface. Variations in shadows, time of day, illuminating color, and other lighting conditions can change the observed color of the illuminated object.

The color of the light leaving the surface of an object may be described as an additive mixture of the primary colors of red, green, and blue light, respectively abbreviated R, G, and B. The RGB color model is an additive color model in which red, green and blue light are added together in various ways to reproduce a broad array of colors. Color TV and video cameras are RGB input devices that use a CMOS or CCD image sensor that operates based on the RGB model.

A color in the RGB color model is described by indicating how much of each of the red, green, and blue is included. The color is expressed as an RGB triplet (r,g,b), each component of which can vary from zero to a defined maximum value. If all the components are at zero the result is black; if all are at maximum, the result is the brightest representable white. In computers, the component values are often stored as integer numbers in the range 0 to 255. These are often represented as either decimal or hexadecimal numbers.

In accordance with an example embodiment of the invention, uneven lighting and object motion are compensated for in video image analysis of vehicular traffic on a highway. In a bootstrap phase, a plurality of sampling points is established by a video unit for a viewing scene that includes the highway as a background object. At each sampling point, a plurality of video images is captured under different lighting conditions and at different exposures, wherein each exposure is optimum for the respective lighting condition. For each sampling point, each combination of lighting condition and optimum exposure is defined as a model and stored in a model database that is either in the video unit or in a cloud database.

In an image capture phase, the objective is to identify a foreground object, such as a vehicle, entering the scene of the background, such as the highway. At selected sampling points, a video image is captured under the current lighting conditions and at an optimum exposure. The RGB color at the optimum exposure for the sampling point is compared with the RGB/exposure combinations in the models for that sampling point in the model database, to find a model having an RGB/exposure combination that is a best match with an existing model in the database. The corresponding lighting condition stored in the matched model represents an estimate of the lighting condition affecting pixels in the region surrounding the sampling point. If approximately the same model lighting condition is found for other sampling points in the video image, then the exposure setting of the video camera is adjusted to the most frequently occurring value for exposure among the selected sampling points.

If the new colors do not match the colors in the model database for that lighting condition, then add an estimated lighting condition, the exposure, and the RGB color as a new model to the model database either in the video unit or in a cloud database, as a dynamic, self-learning process that improves the accuracy of moving object detection.

If approximately the same model lighting condition is not found for other sampling points in the video image, then store an estimate of the lighting condition, the exposure, and the RGB color as a new model in the model database either in the video unit or in a cloud database, as a dynamic, self-learning process that improves the accuracy of moving object detection.

If the variation of detected conditions from multiple sampling points is very large, then create a new lighting condition using the exposure and color at each sampling point, and store these as new models in the model database either in the video unit or in a cloud database, as a dynamic, self-learning process that improves the accuracy of moving object detection. This may happen if there is a local variation in lighting condition, such as a new shade or growing of leaves on a tree or a street light not working.

In accordance with an example embodiment of the invention, a non-optical exposure compensation may be performed on the regional outliers having exposures and color that do not match anything in the model database. For example, an exposure for one region may not be the best exposure of the other regions. If there is a large difference between the current exposure and the ideal exposure for a region, then transform the colors of the region by an exposure transformation for the current exposure and lighting condition for that region, in the model database either in the video unit or in a cloud database, as a dynamic, self-learning process that improves the accuracy of moving object detection. This allows high dynamic range in the video with fast moving objects. Identify the regional outliers as a vehicle entering the scene of the background, such as the highway.

In accordance with an example embodiment of the invention, the model database may be operated for moving object detection of fast moving objects under a variety of lighting conditions, by establishing, during a bootstrap phase, a plurality of sampling points for a viewing scene that includes a background object; capturing, during the bootstrap phase, at each sampling point, a plurality of video images under different lighting conditions, each video image having a color under a respective lighting condition at a respective optimum exposure; storing, during the bootstrap phase, in a model database, for each sampling point, at least one model that is a combination of the color of at least one of the video images, its respective optimum exposure, and its respective lighting condition; and storing, during an image capture phase, new models in the model database either in the video unit or in a cloud database, as a dynamic, self-learning process that improves the accuracy of moving object detection.

DESCRIPTION OF THE FIGURES

FIG. 3A illustrates a database of models of colors at each sampling point for different exposures and lighting conditions. For each sampling point during the bootstrap phase, the video unit stores in the model database, at least one model that is a combination of the color of at least one of the video images, its respective optimum exposure, and its respective lighting condition.

DISCUSSION OF THE PREFERRED EMBODIMENTS

In accordance with an example embodiment of the invention, fast moving objects may be monitored by a video unit under a variety of lighting conditions. In a bootstrap phase, a model database is established either in the video unit or in a cloud database, for each of a plurality of sampling points, each model being a combination of color of the video image, respective optimum exposure, and respective lighting condition. Then in an image capture phase the video unit compares captured color and optimum exposure of the sampling point, with the models of color and respective optimum exposure in the model database, to find a best match lighting condition model in the model database. The video unit then adjusts an exposure setting to the most frequently occurring value for exposure among the other sampling points, if lighting conditions for the other sampling points are within a threshold range of the lighting condition of the best match model in the model database. After changing the setting of the video camera, if the new colors do not match the colors in the database for that condition, then the video unit adds the estimated condition, the exposure, and the RGB color as a new model to the model database, in a self-learning process.

Figure 1:
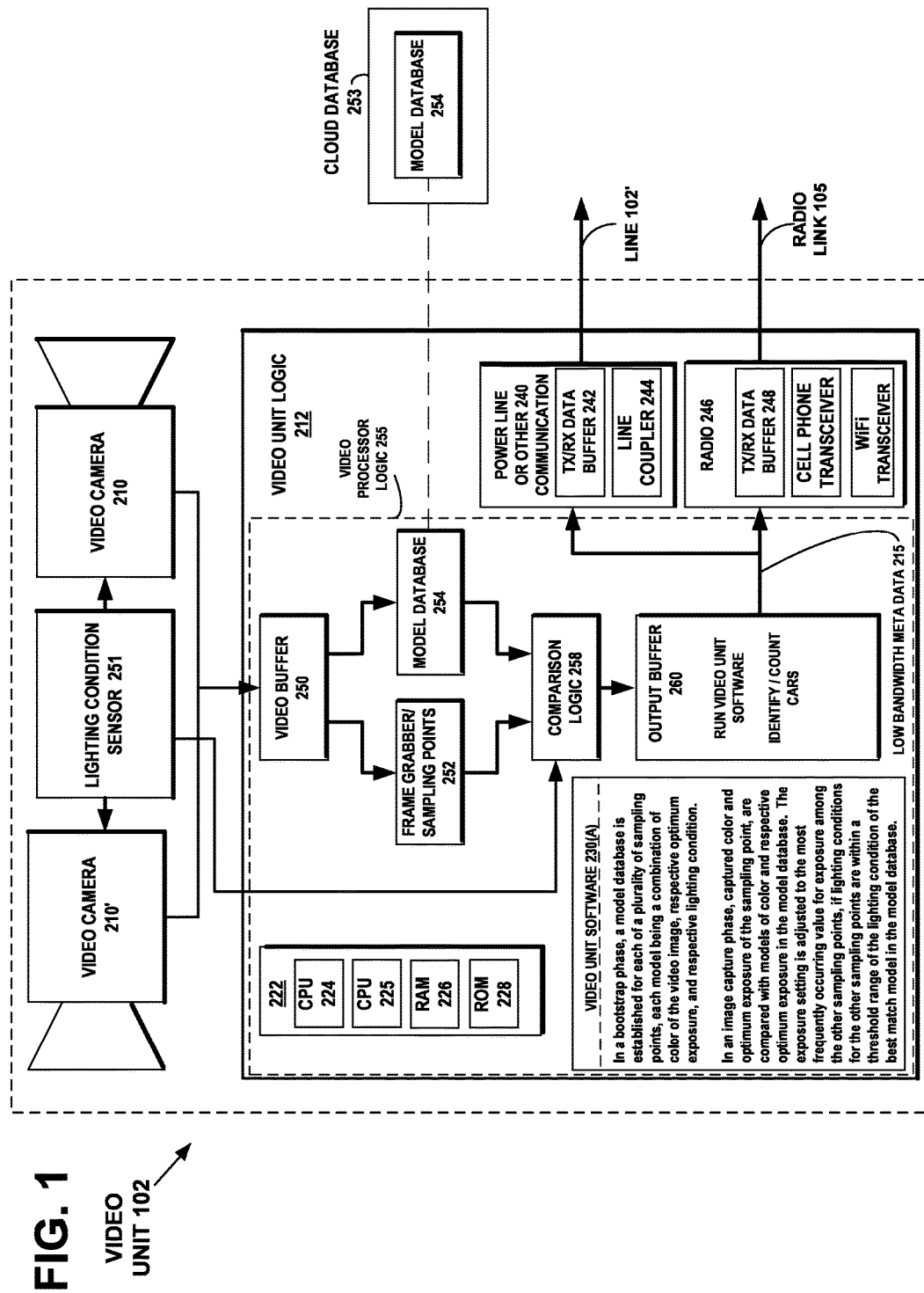
FIG. 1 illustrates an example embodiment of the invention, showing at least one video unit located at a highway, thoroughfare or parking facility, including a video camera, video processor logic, a processor and memory including computer program code. The at least one video unit is configured to cause the video processor logic to process a video stream from the video camera while monitoring traffic events at the thoroughfare or monitoring events at a parking facility, to count the vehicles traversing the highway, thoroughfare or parking facility. The at least one video unit includes a communications unit configured to transmit traffic counting data from the traffic monitoring event to a central controller or terminal.

FIG. 1 illustrates an example embodiment of the invention, showing the at least one video unit 102 located in the geographic area of a highway. The video unit 102 includes a video camera 210, a second video camera 210', lighting condition sensor 251, and video processor logic 255 comprising a video buffer 250, frame grabber/sampled pixels 252, model database 254, comparison logic 258, and output buffer 260. The model database 254 comprises a database of texture models stored in the RAM 226. The models are learned models that characterize and catalog the detection and representation of textures of objects in various lighting, color temperature, shadow and other conditions.

The model database 254 may also be stored in a cloud database 253 and the video unit 102 may store models in and operate out of, or be networked to, the cloud database 253.

The video cameras 210 and 210' comprise an image sensor plus a 3D sensor, including a red, green, blue (RGB) sensor plus an infrared (IR) sensor. A color in the RGB color model is described by indicating how much of each of the red, green, and blue is included. The color is expressed as an RGB triplet (r,g,b), each component of which can vary from zero to a defined maximum value. If all the components are at zero the result is black; if all are at maximum, the result is the brightest representable white. In computers, the component values are often stored as integer numbers in the range 0 to 255. These are often represented as either decimal or hexadecimal numbers.

The model database 254, includes, but is not limited to, multiple reference models for different light and weather conditions, a model of lighting, a model of shadows, and a model of motion. In a bootstrap phase, the video processor logic 255 establishes a plurality of sampling points for a viewing scene that includes the highway as a background object. At each sampling point, a plurality of video images is captured under different lighting conditions and at different exposures, wherein each exposure is optimum for the respective lighting condition. For each sampling point, each combination of lighting condition and optimum exposure is defined as a model and stored in the model database 254. An optimum exposure is one in which the image has the maximum possible sharpness in its definition, given the capabilities of the camera's lenses and its image sensor resolution.

For example, the model of light and weather conditions takes as an input, the current time of day and the level of solar illumination on cloudy versus sunny days. The light and weather model correlates, over time, the background light level illuminating the through-fare, based on the time of day and the level of solar illumination. The light and weather model assigns a score to various background light levels. For a current time of day and the level of solar illumination, the light and weather model provides the corresponding score to the comparison logic 258, as one of the factors used by the comparison logic in determining the texture of the object being monitored.

In the image capture phase, at selected sampling points, the video processor logic 255 captures, for at least one of the sampling points, a video image having a captured color under current lighting conditions and an optimum exposure. An object is observed to have the color of the light leaving its surface, which depends on the spectrum of the light illuminating its surface and the reflectance properties of the surface. Variations in shadows, time of day, illuminating color, and other lighting conditions can change the observed color of the illuminated object.

For at least one of the sampling points, the video processor logic 255 compares the captured color and the optimum exposure, with the at least one model of color and respective optimum exposure in the model database, to find a respective lighting condition of a best match model in the model database 254.

The video processor logic 255 adjusts an exposure setting of the camera 210 in the video unit 102, to a most frequently occurring value for exposure among other ones of the plurality of sampling points, if lighting conditions for the other ones of the plurality of sampling points are within a threshold range of the lighting condition of the best match model in the model database. An example of the threshold range of the lighting condition may be a change in the ambient illuminance of 1 Lux (lx), which is the amount of light on a surface per unit area. A single lux is equal to one lumen per square meter.

After changing the setting of the video camera, if the new colors do not match the colors in the database for that condition, then video processor logic 255 adds the estimated condition, the exposure, and the RGB color as a new model to the model database 254, as a dynamic, self-learning process that improves the accuracy of moving object detection.

If approximately the same model lighting condition is not found for other sampling points in the video image, then video processor logic 255 stores an estimate of the lighting condition, the exposure, and the RGB color as a new model in the model database 254, as a dynamic, self-learning process that improves the accuracy of moving object detection. An estimate of the lighting condition may be obtained by measuring with the lighting condition sensor 251, the amount of light falling on the object's surface, where one lux is one lumen per square meter of the object's surface. Examples of lighting condition light levels are:

Very Bright Summer Day 100,000 Lux
Full Daylight 10,000 Lux
Overcast Summer Day 1,000 Lux
Very Dark Day 100 Lux
Twilight 10 Lux
Full Moon <1 Lux.

If the variation of detected conditions from multiple sampling points is very large, then the video processor logic 255 creates a new lighting condition using the exposure and color at each sampling point, and stores these as new models in the model database 254, as a dynamic, self-learning process that improves the accuracy of moving object detection. This may happen if there is a local variation in condition, such as a new shade or growing of leaves on a tree or a street light stopped working.

The video processor logic 255 performs non-optical exposure compensation on the regional outliers having exposures and color that do not match anything in the model database 254. For example, an exposure for one region may not be the best exposure of the other regions. If there is a large difference between the current exposure and the ideal exposure for a region, then the video processor logic 255 transforms the colors of the region by an exposure transformation for the current exposure and condition for that region, as a dynamic, self-learning process that improves the accuracy of moving object detection. This allows high dynamic range in the video with fast moving objects. The video processor logic 255 may identify the regional outliers as a vehicle entering the scene of the background, such as the highway.

The video unit 102 is configured to encode a preferably low bandwidth message characterizing monitored events. The video unit 102 includes a power line or other low bandwidth medium communications unit 240 that includes a transmit/receive (TX/RX) buffer 242 and a power line or other low bandwidth medium coupler 244, configured to transmit the low bandwidth message to a management controller or terminal over power line or other low bandwidth medium 102'. In an alternate embodiment, the video unit 102 includes a radio unit 246 that includes a transmit/receive (TX/RX) buffer 248, a cell phone transceiver, and a WiFi transceiver, which are configured to transmit the low bandwidth message to a management controller or terminal over a radio link 105.

The video unit 102 includes a processor 222 comprising a dual central processor unit (CPU) or multi-CPU 224/225, a random access memory (RAM) 226 and read only memory (ROM) 228. The memories 226 and/or 228 include computer program code, including video unit software 230(A).

The video unit software 230(A) includes example instructions such as the following:

In a bootstrap phase, a model database is established for each of a plurality of sampling points, each model being a combination of color of the video image, respective optimum exposure, and respective lighting condition.

In an image capture phase, captured color and optimum exposure of the sampling point, are compared with models of color and respective optimum exposure in the model database. The exposure setting is adjusted to the most frequently occurring value for exposure among the other sampling points, if lighting conditions for the other sampling points are within a threshold range of the lighting condition of the best match model in the model database.

Figure 2A:
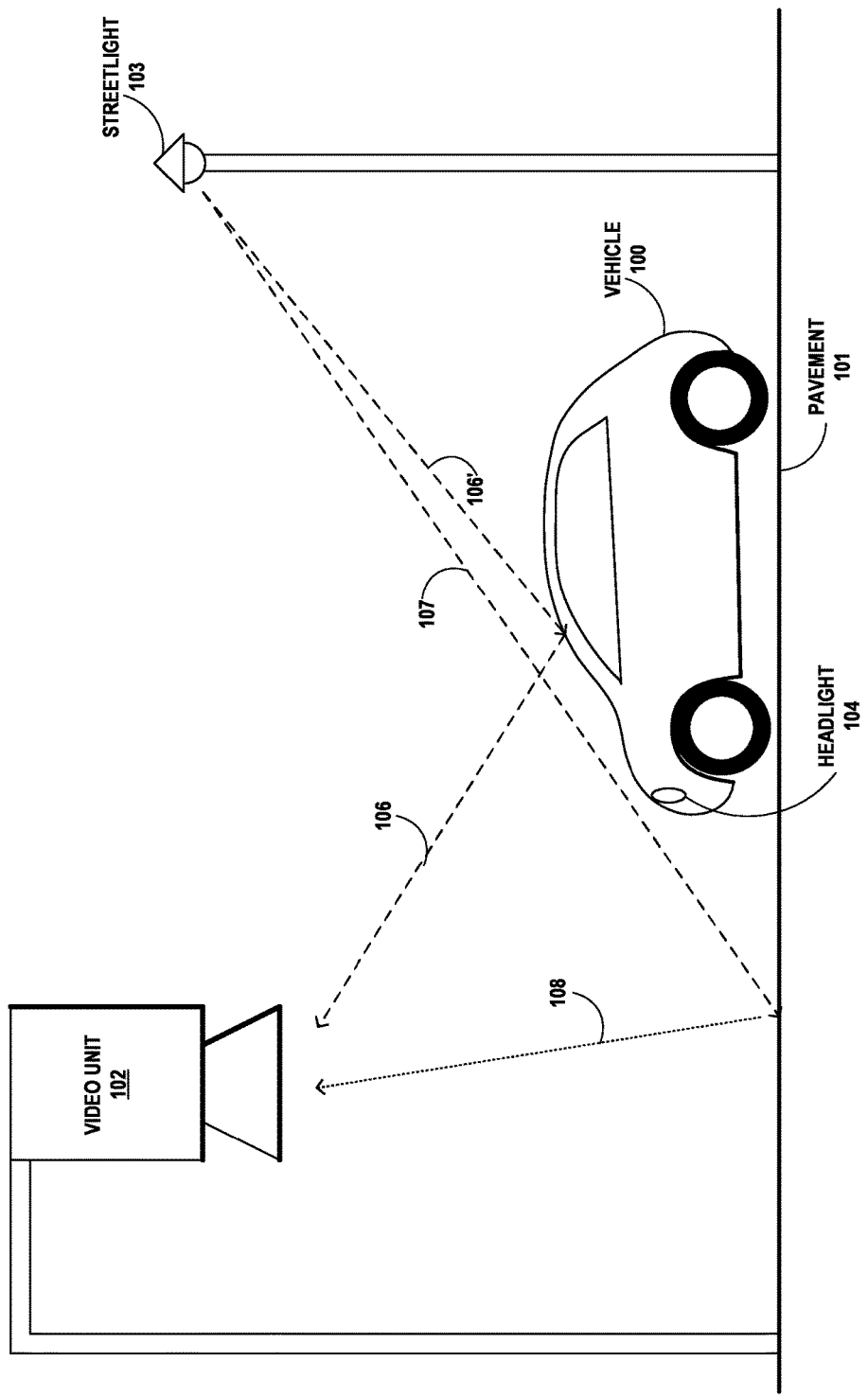
FIG. 2A illustrates a side view an example area along a highway that is monitored by the video unit of FIG. 1. The figure shows a vehicle on the highway pavement and a streetlight illuminating the area. The figure shows light from the streetlight reflected off the vehicle and off the pavement and illuminating the video unit.

FIG. 2A illustrates a side view of an example area along a highway that is monitored by the video unit 102 of FIG. 1. The figure shows a vehicle 100 on the highway pavement 101 and a streetlight 103 illuminating the area. The figure shows light 106' and 107 from the streetlight 103 reflected off the vehicle 100 at 106 and off the pavement 101 at 108 and illuminating the video unit 102. The observed color of the pavement 101 and the vehicle 100 by the video unit 102 depends on both the illuminated object's surface characteristics and the characteristics of the light from the streetlight 103 illuminating their surfaces. An object is observed to have the color of the light leaving its surface, which depends on the spectrum of the light illuminating its surface and the reflectance properties of the surface. Variations in shadows, time of day, illuminating color, and other lighting conditions can change the observed color of the illuminated object.

Figure 2B:
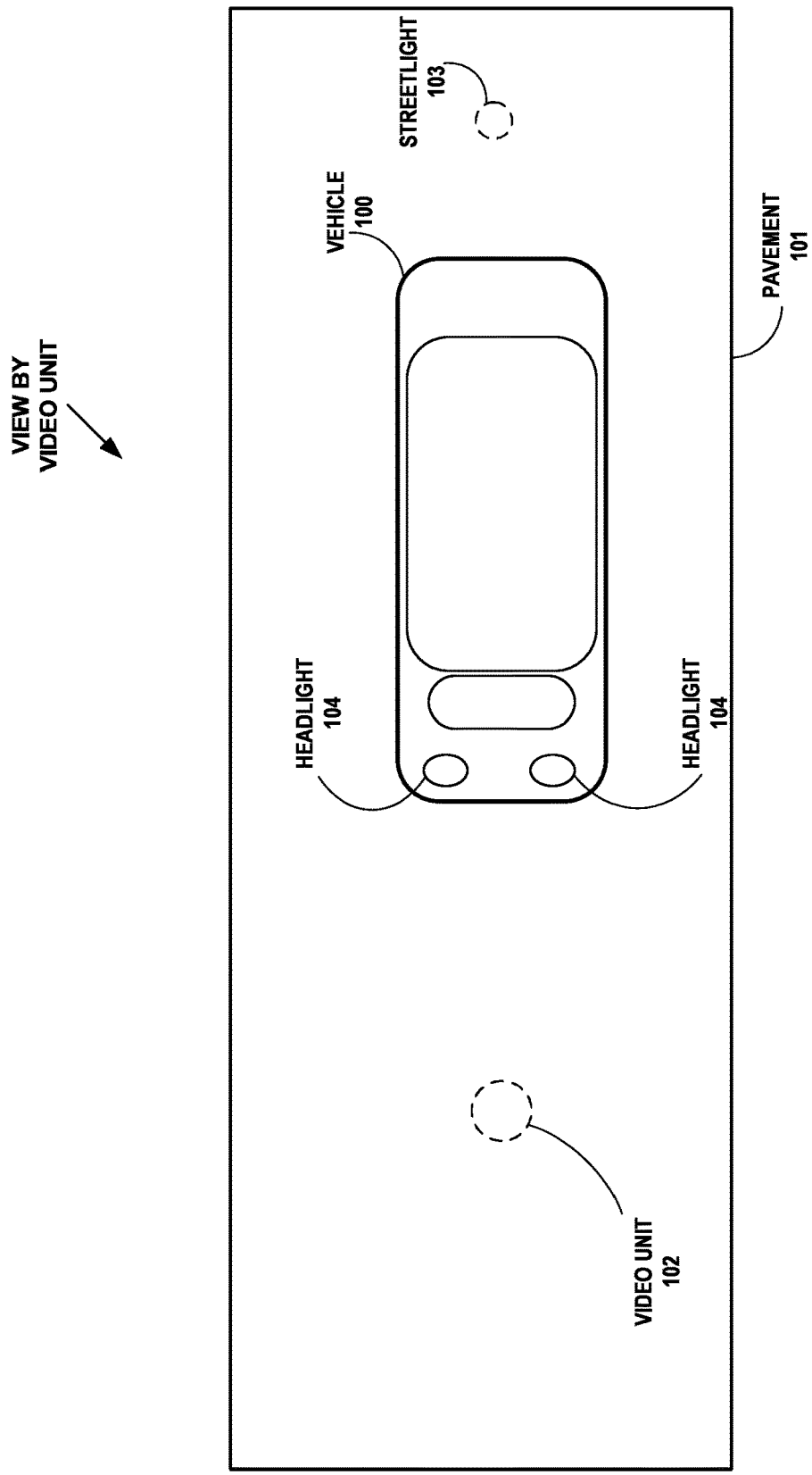
FIG. 2B illustrates a top view of the example area along a highway of FIG. 2A, as seen by the video unit.

FIG. 2B illustrates a top view of the example area along a highway of FIG. 2A, as seen by the video unit 102.

Figure 2C:
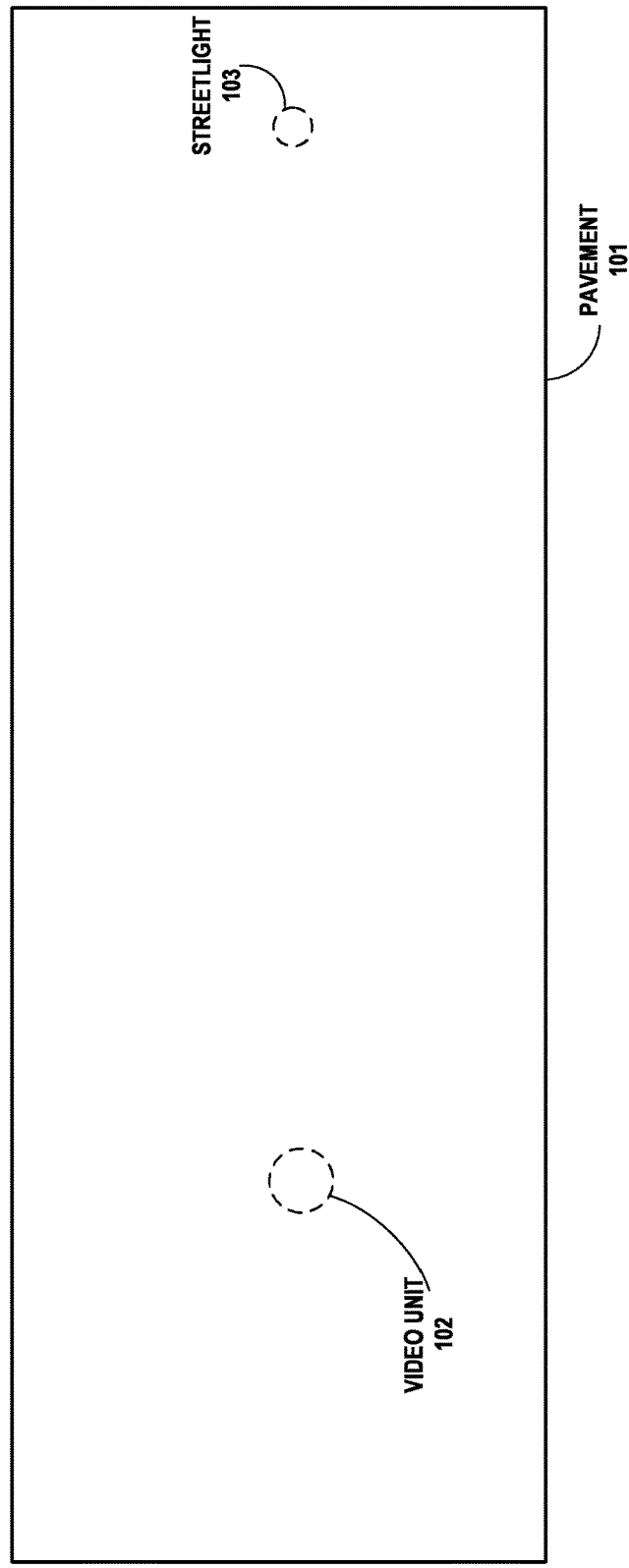
FIG. 2C illustrates a top view of the example area along a highway of FIG. 2A, illustrating the highway as seen under good viewing conditions in ambient daylight, without vehicles on the highway.

FIG. 2C illustrates a top view of the example area along a highway of FIG. 2A, illustrating the highway as seen under good viewing conditions in ambient daylight, without vehicles on the highway.

Figure 3:
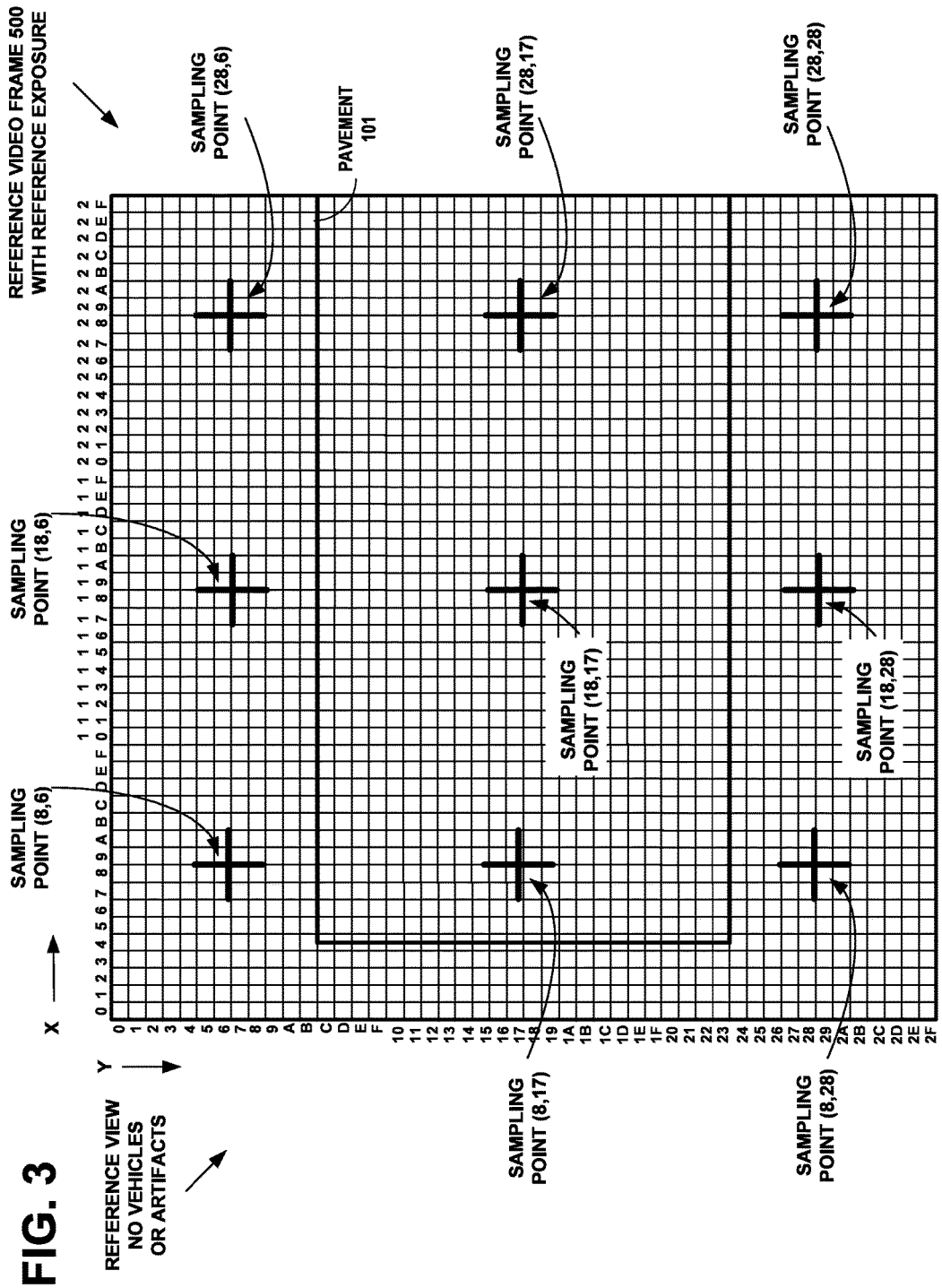
FIG. 3 illustrates a reference video frame image of the example area along the highway of FIG. 2A, illustrating sampling points established during the bootstrap phase, for a viewing scene that includes the highway. At each sampling point, a plurality of video images under different lighting conditions is captured, each video image having a color under a respective lighting condition at a respective optimum exposure.

FIG. 3 illustrates a reference video frame image 500 of the example area along the highway of FIG. 2A, illustrating sampling points established during the bootstrap phase, for a viewing scene that includes the highway. The sampling points are identified by their (x,y) coordinates in the reference video frame image 500. At each sampling point, a plurality of video images under different lighting conditions is captured, each video image having a color under a respective lighting condition at a respective optimum exposure.

FIG. 3A illustrates a model database 254 of models of colors at each sampling point for different exposures and lighting conditions, either in the video unit 102 or in the cloud database 253. For each sampling point during the bootstrap phase, the video unit 102 stores in the model database 254, at least one model that is a combination of the color of at least one of the video images, its respective optimum exposure, and its respective lighting condition.

An example method for operating the model database 254 for moving object detection of fast moving objects under a variety of lighting conditions, includes the following steps:

establishing, by the video processor logic 255 during a bootstrap phase, a plurality of sampling points for a viewing scene that includes a background object;

capturing, by the video processor logic 255 during the bootstrap phase, at each sampling point, a plurality of video images under different lighting conditions, each video image having a color under a respective lighting condition at a respective optimum exposure;

storing, by the video processor logic 255 during the bootstrap phase, in the model database 254, for each sampling point, at least one model that is a combination of the color of at least one of the video images, its respective optimum exposure, and its respective lighting condition; and storing, by the video processor logic 255 during an image capture phase, new models in the model database 254, as a dynamic, self-learning process that improves the accuracy of moving object detection.

Figure 4:
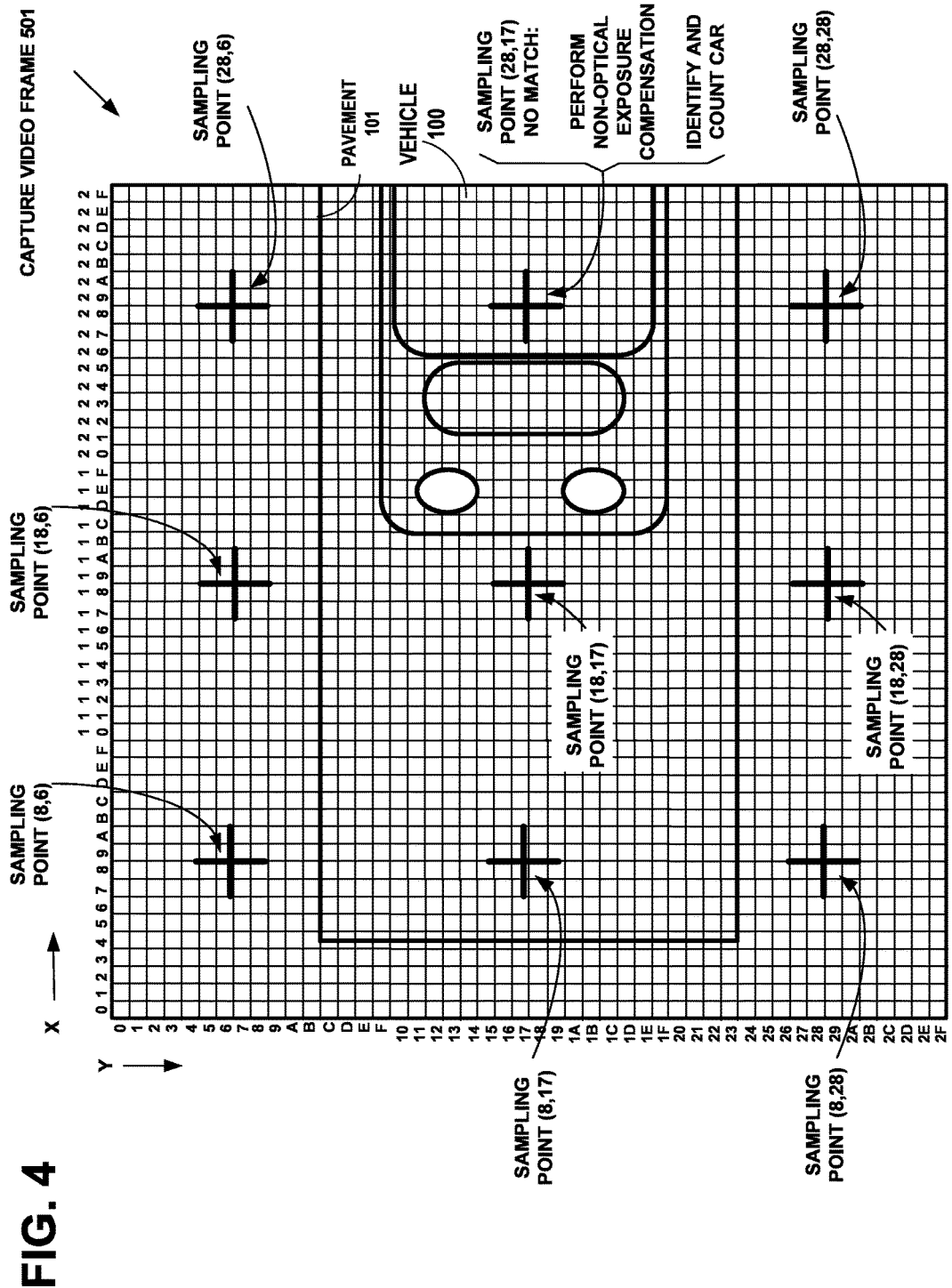
FIG. 4 illustrates the image capture phase wherein at selected sampling points, the video unit captures, for at least one of the sampling points, a video image having a captured color under current lighting conditions and an optimum exposure. For the least one of the sampling points, the captured color and the optimum exposure are compared with the at least one model of color and respective optimum exposure in the model database, to find a respective lighting condition of a best match model in the model database. The video unit adjusts an exposure setting of the video unit, to a most frequently occurring value for exposure among other ones of the plurality of sampling points, if lighting conditions for the other ones of the plurality of sampling points are within a threshold range of the lighting condition of the best match model in the model database.

FIG. 4 illustrates a capture video frame 501 in the image capture phase, wherein at selected sampling points, the video unit 102 captures, for at least one of the sampling points, a video image having a captured color under current lighting conditions and an optimum exposure. For the at least one of the sampling points, the captured color and the optimum exposure are compared with the at least one model of color and respective optimum exposure in the model database 254, to find a respective lighting condition of a best match model in the model database 254. The video unit 102 adjusts an exposure setting of the camera 210 in the video unit, to a most frequently occurring value for exposure among other ones of the plurality of sampling points, if lighting conditions for the other ones of the plurality of sampling points are within a threshold range of the lighting condition of the best match model in the model database. An example of the threshold range of the lighting condition may be a change in the ambient illuminance of 1 Lux (lx), which is the amount of light on a surface per unit area. A single lux is equal to one lumen per square meter.

In the example shown in FIG. 4, the lighting conditions for sampling point (28,17) and a subset of other ones of the plurality of sampling points, do not match any model in the model database 254. In response, video unit 102 identifies that a foreground object, the vehicle 100, has moved over the background highway pavement 101 where the subset of the other ones of the plurality of sampling points are located. The video unit 102 may then count the foreground object as a vehicle 100 moving over the highway 101. The video unit 102 may also perform a non-optical exposure compensation to transform the colors of the region by an exposure transformation for the current exposure and lighting condition for that region. This allows high dynamic range in the video with fast moving objects.

Figure 5A:
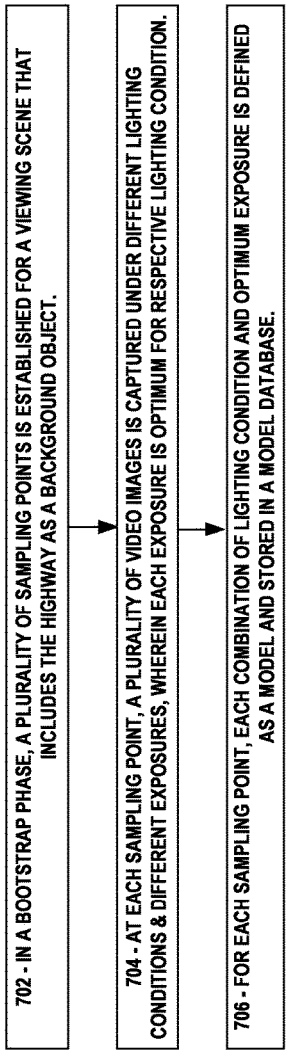
FIG. 5A illustrates an example embodiment of the invention, showing a flow diagram of an example process during the bootstrap phase.

FIG. 5A illustrates an example embodiment of the invention, showing a flow diagram 700 of an example process during the bootstrap phase. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 702—In a bootstrap phase, a plurality of sampling points is established for a viewing scene that includes the highway as a background object.

Step 704—At each sampling point, a plurality of video images is captured under different lighting conditions & different exposures, wherein each exposure is optimum for respective lighting condition.

Step 706—For each sampling point, each combination of lighting condition and optimum exposure is defined as a model and stored in a model database.

Figure 5B:
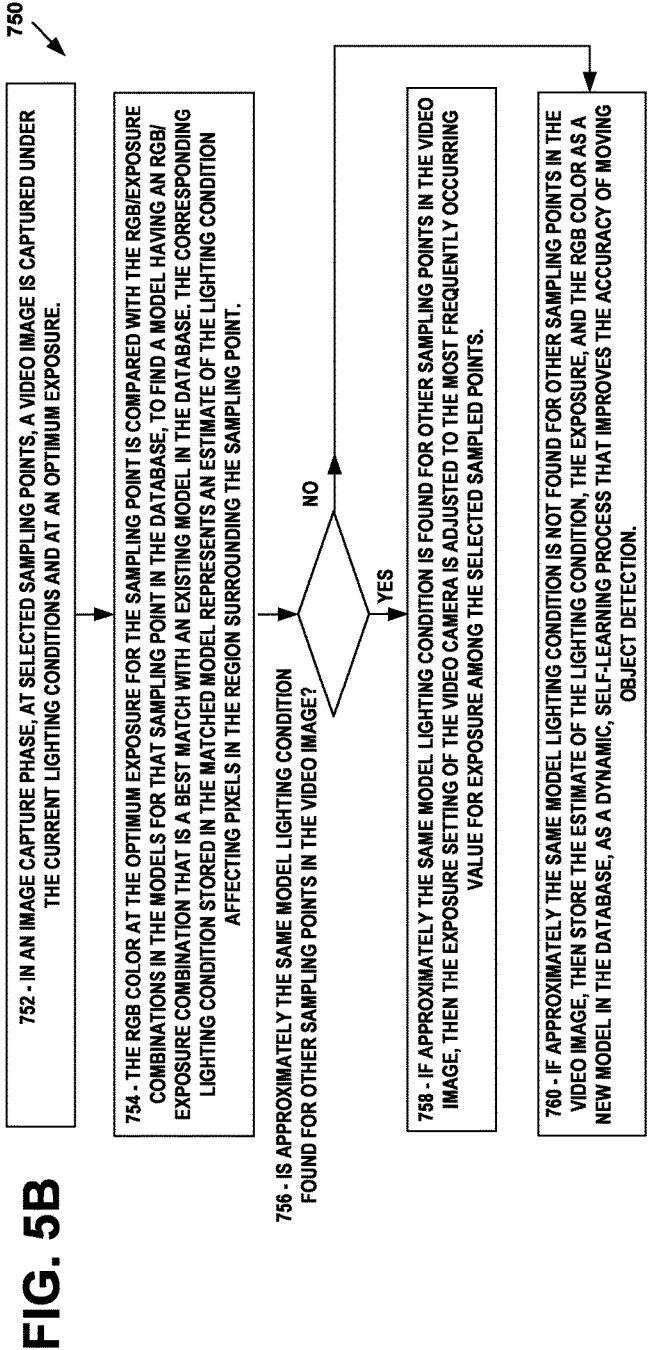
FIG. 5B illustrates an example embodiment of the invention, showing a flow diagram of an example process during the image capture phase.

FIG. 5B illustrates an example embodiment of the invention, showing a flow diagram 750 of an example process during the image capture phase. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 752—In an image capture phase, at selected sampling points, a video image is captured under the current lighting conditions and at an optimum exposure.

Step 754—The RGB color at the optimum exposure for the sampling point is compared with the RGB/exposure combinations in the models for that sampling point in the database, to find a model having an RGB/exposure combination that is a best match with an existing model in the database. The corresponding lighting condition stored in the matched model represents an estimate of the lighting condition affecting pixels in the region surrounding the sampling point.

Step 756—is approximately the same model lighting condition found for other sampling points in the video image? If YES, then go to step 758. If NO, then go to step 760.

Step 758—If approximately the same model lighting condition is found for other sampling points in the video image, then the exposure setting of the video camera is adjusted to the most frequently occurring value for exposure among the selected sampled points.

Step 760—If approximately the same model lighting condition is not found for other sampling points in the video image, then store the estimate of the lighting condition, the exposure, and the RGB color as a new model in the database, as a dynamic, self-learning process that improves the accuracy of moving object detection.

Although specific example embodiments of the invention have been disclosed, persons of skill in the art will appreciate that changes may be made to the details described for the specific example embodiments, without departing from the spirit and the scope of the invention.

What is claimed is:

1. A method for video monitoring of fast moving objects under a variety of lighting conditions, comprising:
   establishing, by a video unit during a bootstrap phase, a plurality of sampling points for a viewing scene that includes a background object;
   capturing, by the video unit during the bootstrap phase, at each sampling point, a plurality of video images under different lighting conditions, each video image having a color under a respective lighting condition at a respective optimum exposure;
   storing, by the video unit during the bootstrap phase, in a model database either in the video unit or in a cloud database, for each sampling point, at least one model that is a combination of the color of at least one of the video images, its respective optimum exposure, and its respective lighting condition;
   capturing, by the video unit during an image capture phase, for at least one of the sampling points, a video image having a captured color under current lighting conditions and an optimum exposure;
   comparing, by the video unit during the image capture phase, for the least one of the sampling points, the captured color and the optimum exposure, with the at least one model of color and respective optimum exposure in the model database, to find a respective lighting condition of a best match model in the model database;
   adjusting, by the video unit during the image capture phase, an exposure setting of the video unit, to a most frequently occurring value for exposure among other ones of the plurality of sampling points, if lighting conditions for the other ones of the plurality of sampling points are within a threshold range of the lighting condition of the best match model in the model database; and
   if lighting conditions for a subset of the other ones of the plurality of sampling points, do not match any model in the model database, then identify that a foreground object has moved over the background object where the subset of the other ones of the plurality of sampling points are located.

2. The method of claim 1, further comprising:
   storing, by the video unit during the image capture phase, in the model database, for the least one of the sampling points, a new model that is a combination of the captured color, its optimum exposure, and the lighting condition of the best match model in the model database, as a dynamic, self-learning process that improves the accuracy of moving object detection, if lighting conditions for the other ones of the plurality of sampling points are not within a threshold range of the lighting condition of the best match model in the model database.

3. The method of claim 1, further comprising:
   if lighting conditions for a subset of the other ones of the plurality of sampling points, are not within a larger threshold range than said threshold range of the lighting condition of the best match model in the model database, then create a new lighting condition using the respective exposure and color at each of the subset of the other ones of the plurality of sampling points, and store these as new models in the model database, as a dynamic, self-learning process that improves the accuracy of moving object detection.

4. The method of claim 1, further comprising:
   count the foreground object as a vehicle moving over a highway as a the background object.

5. The method of claim 1, further comprising:
   if lighting conditions for a subset of the other ones of the plurality of sampling points, do not match any model in the mode database, then perform a non-optical exposure compensation on the subset of the other ones of the plurality of sampling points and store these as new models in the model database, as a dynamic, self-learning process that improves the accuracy of moving object detection.

6. A computer program product comprising computer executable program code recorded on a computer readable, non-transitory storage medium, for video monitoring of fast moving objects under a variety of lighting conditions, comprising:
   code for establishing, by a video unit during a bootstrap phase, a plurality of sampling points for a viewing scene that includes a background object;
   code for capturing, by the video unit during the bootstrap phase, at each sampling point, a plurality of video images under different lighting conditions, each video image having a color under a respective lighting condition at a respective optimum exposure;
   code for storing, by the video unit during the bootstrap phase, in a model database either in the video unit or in a cloud database, for each sampling point, at least one model that is a combination of the color of at least one of the video images, its respective optimum exposure, and its respective lighting condition;
   code for capturing, by the video unit during an image capture phase, for at least one of the sampling points, a video image having a captured color under current lighting conditions and an optimum exposure;
   code for comparing, by the video unit during the image capture phase, for the least one of the sampling points, the captured color and the optimum exposure, with the at least one model of color and respective optimum exposure in the model database, to find a respective lighting condition of a best match model in the model database;

code for adjusting, by the video unit during the image capture phase, an exposure setting of the video unit, to a most frequently occurring value for exposure among other ones of the plurality of sampling points, if lighting conditions for the other ones of the plurality of sampling points are within a threshold range of the lighting condition of the best match model in the model database; and code for, if lighting conditions for a subset of the other ones of the plurality of sampling points, do not match any model in the model database, then identifying, by the video unit during the image capture phase, that a foreground object has moved over the background object where the subset of the other ones of the plurality of sampling points are located.

7. The computer program product of claim 6, further comprising:

code for storing, by the video unit during the image capture phase, in the model database, for the least one of the sampling points, a new model that is a combination of the captured color, its optimum exposure, and the lighting condition of the best match model in the model database, as a dynamic, self-learning process that improves the accuracy of moving object detection, if lighting conditions for the other ones of the plurality of sampling points are not within a threshold range of the lighting condition of the best match model in the model database.

8. The computer program product of claim 6, further comprising:

code for, if lighting conditions for a subset of the other ones of the plurality of sampling points, are not within a larger threshold range than said threshold range of the lighting condition of the best match model in the model database, then creating, by the video unit during the image capture phase, a new lighting condition using the respective exposure and color at each of the subset of the other ones of the plurality of sampling points, and store these as new models in the model database, as a dynamic, self-learning process that improves the accuracy of moving object detection.

9. The computer program product of claim 6, further comprising:

code for counting, by the video unit during the image capture phase, the foreground object as a vehicle moving over a highway as a the background object.

10. The computer program product of claim 6, further comprising:

code for, if lighting conditions for a subset of the other ones of the plurality of sampling points, do not match any model in the mode database, then performing, by the video unit during the image capture phase, a non-optical exposure compensation on the subset of the other ones of the plurality of sampling points and store these as new models in the model database, as a dynamic, self-learning process that improves the accuracy of moving object detection.

11. An apparatus for video monitoring of fast moving objects under a variety of lighting conditions, comprising:

a video unit located within viewing distance of a highway, including a video camera, video processor, a processor and memory including computer program code configured to cause the video processor to process a video stream from the video camera;

the video processor configured to establish during a bootstrap phase, a plurality of sampling points for a viewing scene that includes a background object;

the video processor configured to capture during the bootstrap phase, at each sampling point, a plurality of video images under different lighting conditions, each video image having a color under a respective lighting condition at a respective optimum exposure;

the video processor configured to store during the bootstrap phase, in a model database either in the video unit or in a cloud database, for each sampling point, at least one model that is a combination of the color of at least one of the video images, its respective optimum exposure, and its respective lighting condition;

the video processor configured to capture during an image capture phase, for at least one of the sampling points, a video image having a captured color under current lighting conditions and an optimum exposure;

the video processor configured to compare during the image capture phase, for the least one of the sampling points, the captured color and the optimum exposure, with the at least one model of color and respective optimum exposure in the model database, to find a respective lighting condition of a best match model in the model database;

the video processor configured to adjust during the image capture phase, an exposure setting of the video unit, to a most frequently occurring value for exposure among other ones of the plurality of sampling points, if lighting conditions for the other ones of the plurality of sampling points are within a threshold range of the lighting condition of the best match model in the model database; and if lighting conditions for a subset of the other ones of the plurality of sampling points, do not match any model in the mode database, then the video processor configured to identify that a foreground object has moved over the background object where the subset of the other ones of the plurality of sampling points are located.

12. The apparatus of claim 11, further comprising:

the video processor configured to store during the image capture phase, in the model database, for the least one of the sampling points, a new model that is a combination of the captured color, its optimum exposure, and the lighting condition of the best match model in the model database, as a dynamic, self-learning process that improves the accuracy of moving object detection, if lighting conditions for the other ones of the plurality of sampling points are not within a threshold range of the lighting condition of the best match model in the model database.

13. The apparatus of claim 11, further comprising:

if lighting conditions for a subset of the other ones of the plurality of sampling points, are not within a larger threshold range than said threshold range of the lighting condition of the best match model in the model database, then the video processor configured to create a new lighting condition using the respective exposure and color at each of the subset of the other ones of the plurality of sampling points, and store these as new models in the model database, as a dynamic, self-learning process that improves the accuracy of moving object detection.

14. The apparatus of claim 11, further comprising:

the video processor configured to count the foreground object as a vehicle moving over a highway as a the background object.

15. The apparatus of claim 11, further comprising:
if lighting conditions for a subset of the other ones of the plurality of sampling points, do not match any model in the mode database, then the video processor configured to perform a non-optical exposure compensation on the subset of the other ones of the plurality of sampling points and store these as new models in the model database, as a dynamic, self-learning process that improves the accuracy of moving object detection.

16. A method for operating a model database for moving object detection of fast moving objects under a variety of lighting conditions, comprising:
establishing, by a video processor during a bootstrap phase, a plurality of sampling points for a viewing scene that includes a background object;
capturing, by the video processor during the bootstrap phase, at each sampling point, a plurality of video images under different lighting conditions, each video image having a color under a respective lighting condition at a respective optimum exposure;
storing, by the video processor during the bootstrap phase, in a model database either in the video processor or in a cloud database, for each sampling point, at least one model that is a combination of the color of at least one of the video images, its respective optimum exposure, and its respective lighting condition;
storing, by the video processor during an image capture phase, new models in the model database, as a dynamic, self-learning process that improves the accuracy of moving object detection; and
if lighting conditions for a subset of the plurality of sampling points, do not match any model in the model database, then identify that a foreground object has moved over a background object where the subset of the plurality of sampling points is located.

17. A computer program product comprising computer executable program code recorded on a computer readable, non-transitory storage medium, for operating a model database for moving object detection of fast moving objects under a variety of lighting conditions, comprising:
code for establishing, by a video processor during a bootstrap phase, a plurality of sampling points for a viewing scene that includes a background object;
code for capturing, by the video processor during the bootstrap phase, at each sampling point, a plurality of video images under different lighting conditions, each video image having a color under a respective lighting condition at a respective optimum exposure;
code for storing, by the video processor during the bootstrap phase, in a model database either in the video processor or in a cloud database, for each sampling point, at least one model that is a combination of the color of at least one of the video images, its respective optimum exposure, and its respective lighting condition;
code for storing, by the video processor during an image capture phase, new models in the model database, as a dynamic, self-learning process that improves the accuracy of moving object detection; and
code for, if lighting conditions for a subset of the plurality of sampling points, do not match any model in the model database, then identify that a foreground object has moved over a background object where the subset of the plurality of sampling points is located.

* * * * *